(12) United States Patent
Hirasawa et al.

(10) Patent No.: US 6,738,180 B2
(45) Date of Patent: May 18, 2004

(54) OPTICAL TRANSMISSION SYSTEM

(75) Inventors: Takeshi Hirasawa, Tokyo (JP); Yoshihiro Emori, Tokyo (JP); Soko Kado, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 96 days.

(21) Appl. No.: 10/085,709

(22) Filed: Mar. 1, 2002

(65) Prior Publication Data

US 2002/0154386 A1 Oct. 24, 2002

(30) Foreign Application Priority Data

Mar. 1, 2001 (JP) ........................................ 2001-057427

(51) Int. Cl.[7] .............................................. H01S 3/00
(52) U.S. Cl. ...................................................... 359/334
(58) Field of Search .......................................... 359/334

(56) References Cited

U.S. PATENT DOCUMENTS 6,310,716 B1 * 10/2001 Evans et al. ................. 359/334
6,532,101 B2 * 3/2003 Islam et al. .................. 359/334

FOREIGN PATENT DOCUMENTS

| EP | 1 170 888 | 1/2002 | ............ H04B/10/17 |
| WO | WO 98 49088 | 9/1988 | ............ H04B/10/17 |
| WO | WO 00 49721 | 8/2000 | |
| WO | WO 01 09991 | 2/2001 | |

OTHER PUBLICATIONS

Masuda et al. 76–nm 3–dB gain–band hybrid fiber amplifier without gain–equalizer. Optical Amplifiers and Their Applications. 1998 Technical digest. pp. 78–81.*

Masuda et al. Ultra–wideband Optical Amplification with a 3–dB Bandwidth of 67 nm using a partially Gain–Flattened Erbium–doped Fiber Amplifier and Raman Amplification. Optical Amplifiers and Their Applications. 1997 Technical Digest. pp. 329–332.*

* cited by examiner

Primary Examiner—Thomas G. Black
Assistant Examiner—Deandra M. Hughes
(74) Attorney, Agent, or Firm—Oblon, Spivak, McClelland, Maier & Neustadt, P.C.

(57) ABSTRACT

An optical transmission system is provided in which a plurality of Raman amplifiers are combined so that the wavelength band of a first Raman amplifier in the form of an upward convex curve including the maximum gain value and the wavelength band of a second Raman amplifier in the form of a downward convex curve including the minimum gain value overlap with each other, and that the wavelength band of the first Raman amplifier in the form of a downward convex curve including the minimum gain value and the wavelength band of the second Raman amplifier in the form of an upward convex curve including the maximum gain value overlap with each other. This arrangement also applies to cases where three or more amplifiers are used. Due to this arrangement, an optical transmission system is realized in which it is possible to attain a reduction in Raman gain flatness without using any means such as an equalizer.

4 Claims, 9 Drawing Sheets

OPTICAL TRANSMISSION SYSTEM

BACKGROUND OF THE INVENTION

1. Field of the Invention

The present invention relates to an improvement of gain flatness of a Raman amplifier using a wavelength multiplexed pump light source in a wavelength-division multiplexing transmission system.

2. Description of the Related Art

An optical fiber using silica as its main component and containing germanium in its core is widely used. It is known that, in a Raman amplifier using this optical fiber, maximum Raman gain value is obtained at a wavelength spaced apart by approximately 100 nm to the long wavelength side from the pump light source wavelength. An attempt has been made, utilizing this phenomenon, to amplify a wavelength-division multiplexing signal (hereinafter referred to as WDM signal) using a plurality of light sources of different wavelengths (hereinafter referred to as wavelength multiplexed pump light sources). To prevent pump lightwave on the longest wavelength side of the wavelength multiplexed pump light source from overlapping signal lightwaves on the shortest wavelength side of the WDM signal, it is necessary for the maximum wavelength band of the wavelength multiplexed pump light source to be approximately 100 nm.

Japanese Patent Application Laid-open No. 2000-98433 discloses that it is necessary to improve the flattening of the Raman gain wavelength property over a wide band in order to effect wavelength-division multiplexing transmission of signal lightwaves, and that it is necessary to take into account the wavelength arrangement of the wavelength multiplexed pump light source.

More specifically, regarding the arrangement of a plurality of pump light sources of different wavelengths, when the wavelength interval between adjacent pump lightwaves is less than 6 nm, it is impossible to secure a margin obtained by adding the band width of a combiner which does not involve an increase in the insertion loss of the combiner due to crosstalk of the combiner when combining pump lightwaves of different wavelengths to the band width of the pump light source. When the wavelength interval exceeds 35 nm, a reduction in gain which is so great as to be unsuitable for wavelength-division multiplexing transmission occurs near the center of the total Raman gain band width of the respective Raman gains generated from adjacent wavelengths, so that it is necessary for the wavelength interval of the pump lightwave to be in the range of 6 nm to 35 nm.

Further, there has been disclosed a technique in which, in order to make the wavelength interval of adjacent pump light sources as small as possible so that the total gain flatness may not increase, the pump lightwave is divided into lightwaves for forward pump and lightwaves for backward pump; for example, the pump light wavelength interval respectively belonging to the forward pump and backward pump is approximately 6 nm, and pump light wavelengths $\lambda_2, \lambda_4, \ldots$ respectively belonging to the backward pump are arranged between pump light wavelengths $\lambda_1, \lambda_3, \ldots$ belonging to the forward pump, whereby the pump light wavelength interval of the Raman amplifier is made less than 6 nm to realize a dense pump light wavelength arrangement, making it possible to realize a Raman amplifier so that the difference between maximum and minimum of the Raman gain wavelength property of the Raman amplifier, that is, the gain flatness is so small as to allow dense WDM transmission.

In the Raman amplifier disclosed in Japanese Patent Application Laid-open No. 2000-98433, forward pump and backward pump are treated independently; assuming that the combining position of forward pump lightwave is A and that the combining position of backward pump lightwave is B, the longitudinal section A→B of the optical fiber where stimulated Raman scattering is generated by the forward pump lightwave and the longitudinal section B→A of the optical fiber where stimulated Raman scattering is generated by the backward pump lightwave are common to each other except for the pump direction.

That is, in the invention as disclosed in Japanese Patent Application Laid-open No. 2000-98433, an amplifier is formed so that gain flatness is so small as to allow dense WDM transmission by using a forward pump light source and a backward pump light source, Raman amplification being effected in the same section in the optical transmission system.

However, any practical Raman amplifier has a certain amount of gain deviation within the gain band even if it is the Raman amplifier with small gain flatness as disclosed in Japanese Patent Application Laid-open No.2000-98433.

That is, regarding the Raman amplifier in which forward pump and backward pump are combined with each other, even in the case of an amplifier with small gain flatness, when Raman amplifiers of the same gain wavelength property are used in a plurality of stages, the wavelength determining the maximum value of the Raman gain wavelength property and the wavelength determining the minimum value thereof are the same in each Raman amplifier, so that each time the amplification stages are passed, the maximum values and minimum values of the Raman gain wavelength property are accumulated, and the deviation of the Raman gain wavelength property increases, with the result that there is a large difference in power between the channels, resulting in a rather poor degree of flatness. For example, when inputting a WDM signal to an optical amplifier using an erbium doped optical fiber (EDF), or after outputting it from the optical amplifier, it is necessary to compensate for the power for each channel by a means like an equalizer.

SUMMARY OF THE INVENTION

According to a first aspect of the present invention, there is provided an optical transmission system characterized in that: a plurality of Raman amplifiers including a plurality of pump light sources of different pump wavelengths are used; the longitudinal section of the optical fiber where stimulated Raman scattering is generated differs depending upon the plurality of Raman amplifiers; and the plurality of Raman amplifiers mutually compensate for the respective Raman gain wavelength properties.

That is, according to the first aspect of the present invention, there is provided an optical transmission system in which, at an output point for a wavelength division multiplexing signal of the optical transmission system using a plurality of stages of Raman amplifiers, the total Raman gain flatness of the plurality of Raman amplifiers smaller than the cumulative flatness on the assumption that every amplifier has the same gain profile of one of the plurality of Raman amplifier.

According to a second aspect of the present invention, in the first aspect of the invention, there is provided an optical transmission system characterized in that the plurality of Raman amplifiers are designed to be of at least two types of pump wavelength sets, and when there exist a plurality of Raman amplifiers of the same pump wavelengths which use the same kind of amplifier fibers, they include different set gains.

According to a third aspect of the present invention, in the first or second aspect of the invention, there is provided an optical transmission system characterized in that: at least a first Raman amplifier and a second Raman amplifier are used as the plurality of Raman amplifiers; a wavelength band where the Raman gain wavelength property of the first Raman amplifier exhibits an upward convex curve including a maximum value of Raman gain of $G_{Amax}$ at a wavelength of $\lambda_{Amax}$ and a wavelength band where the Raman gain wavelength property of the second Raman amplifier exhibits a downward convex curve including a minimum value of Raman gain of $G_{Bmin}$ at a wavelength of $\lambda_{Bmin}$ overlap with each other; a wavelength band where the Raman gain wavelength property of the first Raman amplifier exhibits an downward convex curve including a minimum value of Raman gain of $G_{Amin}$ at a wavelength of $\lambda_{Amin}$ and a wavelength band where the Raman gain wavelength property of the second Raman amplifier exhibits an upward convex curve including a maximum value of Raman gain of $G_{Bmax}$ at a wavelength of $\lambda_{Bmax}$ overlap with each other; and the total Raman gain flatness is smaller than the flatness of said first Raman amplifier and said second Raman amplifier.

That is, according to the third aspect of the invention, there is provided an optical transmission system in which, regarding the gain flatness of the optical transmission system using the first Raman amplifier and the second Raman amplifier, the maximum and minimum values of the respective Raman gain wavelength properties of the first Raman amplifier and the second Raman amplifier are not accumulated to cause an increase in the total Raman gain flatness, and in which the total Raman gain flatness can be set to be smaller than the gain flatness of each of the first Raman amplifier and the second Raman amplifier.

According to a fourth aspect of the present invention, in the third aspect of the invention, there is provided an optical transmission system characterized in that the wavelength $\lambda_{Amax}$ and the wavelength $\lambda_{Bmin}$ are substantially equal to each other, and in which the wavelength $\lambda_{Amin}$ and the wavelength $\lambda_{Bmax}$ are substantially equal to each other.

That is, according to the fourth aspect of the invention, there is provided an optical transmission system, in which the total Raman gain flatness of the optical transmission system using the first Raman amplifier and the second Raman amplifier is minimum.

According to a fifth aspect of the present invention, in any one of the first to fourth aspects of the invention, there is provided an optical transmission system characterized in that at least one of a discrete Raman amplifier and a distributed Raman amplifier is used as the Raman amplifier.

That is, according to the fifth aspect of the invention, there is provided an optical transmission system, in which discrete amplifiers or distributed amplifiers are used so that the total Raman gain flatness is smaller than the each Raman gain flatness of the plurality of Raman amplifiers constituting the optical transmission system.

For example, when laying a new line as a transmission path or when newly installing a Raman amplifier in an existing line where no Raman amplifier is used, the deviation of the gain wavelength property increases cumulatively if a large number of stages of Raman amplifiers having the same gain wavelength property are used when a large number of stages of Raman amplifiers are required, so that it is necessary to select either a discrete Raman amplifier or a distributed Raman amplifier for each Raman amplifier in order that the respective gain wavelength properties of the Raman amplifiers mutually compensate for so as to decrease the total gain flatness. When Raman amplifiers are to be added to an existing optical transmission system in which a Raman amplifier has already been installed, it is necessary to select either a discrete amplifier or a distributed amplifier for each of the additional Raman amplifiers in order that the gain wavelength property of the existing Raman amplifier and the gain wavelength property of the additional Raman amplifiers may mutually compensate for so as to decrease the total Raman gain flatness.

Here, the theory on which the present invention is based will be described.

There are two kinds of Raman amplifiers: a distributed amplifier and a discrete amplifier. In the distributed Raman amplifier, mainly the optical fiber transmission path itself is used as the medium for Raman amplification, so that, taking into account the distortion generated when, for example, amplifying the WDM signal, the optical fiber transmission path is one whose effective core area Aeff in the signal band wavelength is from approximately 50 $\mu m^2$ to 100 $\mu m^2$. It is not necessary for the actual gain of the distributed amplifier, that is, the Raman gain, to exceed the transmission loss of a relay section of the optical transmission path itself.

The discrete Raman amplifier is used as a relay amplifier, so that the effective core area Aeff in the signal band wavelength is made as small as approximately 10 $\mu m^2$ to 30 $\mu m^2$ to thereby increase the non-linearity, and, as far as the Raman gain due to the effective core area Aeff is concerned, it is so designed that the Raman gain of the discrete Raman amplifier is larger than the Raman gain of the distributed Raman amplifier by approximately 10 dB. Further, since the discrete Raman amplifier is used as a relay amplifier, a Raman gain which is in excess of the transmission loss of the highly non-linear optical fiber constituting the discrete Raman amplifier is required. That is, the gain of the discrete Raman amplifier must be a net gain, which is an apparent gain.

In the case of signal/wavelength and pump lightwave/wavelength, the Raman gain is approximately given as: $G=\exp(g_R P_O L_{eff}/Aeff)$, where $g_R$ is the Raman gain coefficient; $P_O$ is the pump light power at the pump light input end of the optical fiber constituting the Raman amplifier; and $L_{eff}$ is the length (effective length) generating effective stimulated Raman effect. Assuming that $\alpha_p$ is the attenuation per unit length of the pump lightwave, $L_{eff}=(1/\alpha_p)[1-\exp(-\alpha_p L)]$. L is the length of the longitudinal section of the optical fiber where stimulated Raman scattering is generated by the Raman amplifier.

Thus, to experimentally obtain a Raman gain coefficient belonging to a desired wavelength band, a pump lightwave in which the pump light wavelength $\lambda_p$ is fixed to the shortest wavelength side of the desired wavelength band is input to the pump light input end of the optical fiber constituting the Raman amplifier, and the signal light wavelength $\lambda_s$ is swept from the short wavelength side to the long wavelength side of the desired wavelength band, measuring the pump light power $P_O$ at the pump light input end of the optical fiber constituting the Raman amplifier and the input end signal lightwaves input $P_1$ and the output end signal lightwave output $P_2$ of the Raman amplifier.

In correspondence with the fixed pump light wavelength $\lambda_p$ and the swept signal light wavelength $\lambda_s$, the apparent gain (net gain) $G_N=10 \log(P_2/P_1)$ is obtained from the input end signal lightwaves input $P_1$ and the output end signal lightwaves output $P_2$, and the signal light transmission loss $\alpha_s L$ which is the product of the attenuation $\alpha_s$ per unit length in the signal light wavelength of the optical fiber constituting the Raman amplifier by the length L of the optical fiber constituting the Raman amplifier, obtaining the actual gain (Raman gain) G from the equation: $G=G_n+\alpha_s L$.

The pump light power $P_O$ at the pump light input end of the optical fiber constituting the Raman amplifier can be measured, and, since the length L of the optical fiber constituting the Raman amplifier is known, $L_{eff}$ can be obtained through calculation. Since the gain G has been obtained, $g_R/Aeff$ can be obtained from the equation: $G=\exp(g_R P_O L_{eff}/Aeff)$, and since Aeff is known by a well-known experiment method, $g_R$ can be obtained. For $g_R$ to be clearly measured, it is necessary for the pump light power $P_O$ at the pump light input end of the optical fiber constituting the Raman amplifier to be approximately +10 dBm, and the signal lightwaves is required to be approximately −20 dBm.

Assuming that $\upsilon_p$ is the frequency corresponding to the pump light wavelength $\lambda_p$ and that $\upsilon_s$ is the frequency corresponding to the signal light wavelength $\lambda_s$, the above-mentioned Raman gain coefficient $g_R(\upsilon_p, \upsilon_s)$ is obtained with respect to the parameters $(\upsilon_p, \upsilon_s)$ of the fixed pump light frequency $\upsilon_p$ and the signal frequency $\upsilon_s$ of the signal to be swept. It is theoretically known that the generalized Raman gain coefficient $g_R$ depends upon the frequency shift $\Delta\upsilon=\upsilon_p-\upsilon_s$. Thus, in order to obtain the generalized Raman gain coefficient $g_R(\Delta\upsilon)$, $g_R(\Delta\upsilon)$ of the same magnitude is brought into correspondence with $g_R(\upsilon_p, \upsilon_s)$ corresponding to the parameters $(\upsilon_p, \upsilon_s)$, and the parameters $(\upsilon_p, \upsilon_s)$ are replaced by the frequency shift $\Delta\upsilon=\upsilon_p-\upsilon_s$.

In this way, the wavelength (frequency) dependency of the generalized Raman gain coefficient (or $g_R/Aeff$) is obtained to prepare a table of wavelength (frequency)/Raman gain coefficient (or $g_R/Aeff$).

The basic idea regarding the way pump lightwave, signal lightwaves, and optical fiber attenuation are related with each other in Raman amplification is described in "Pump Interactions in a 100 nm Bandwidth Raman Amplifier" IEEE PHOTONICS TECHNOLOGY LETTERS, VOL.11, No. 5, MAY 1999, p.530.

Based on this idea, a basic equation showing how pump as lightwave, signal lightwaves, and optical fiber attenuation for Raman amplifier simulation are related was obtained on the assumption that the pump lightwave and signal lightwaves advance, that Rayleigh scattering is small, and that the influence of spontaneous emission light is negligible.

Assuming that the optical fiber attenuation at frequency $\upsilon$ is $\alpha_\upsilon$, that the effective core area is $Aeff_\upsilon$, and that the Raman gain coefficient between frequency $\xi$ and frequency $\upsilon$ is $g_R(\xi-\upsilon)=g_{\xi\upsilon}$, the change in power at the time when advancing wave of power $P_\upsilon$ at frequency $\upsilon$ has advanced by distance Z is expressed by the following equation:

$$\frac{dP_\upsilon}{dz} = -\alpha_\upsilon P_\upsilon + P_\upsilon \int_{\varsigma>\upsilon} \frac{g_{\varsigma\upsilon}}{A_{\text{eff}\varsigma}} P_\varsigma d\varsigma - P_\upsilon \int_{\varsigma<\upsilon} \frac{g_{\upsilon\varsigma}}{A_{\text{eff}\upsilon}} P_\varsigma d\varsigma \quad \text{Equation 1}$$

It is assumed here that the powers of WDM signals at frequencies $\upsilon_1, \upsilon_2, \ldots, \upsilon_n$ are $P_{s\upsilon 1}, P_{s\upsilon 2}, \ldots, P_{s\upsilon n}$, that the powers of multiplexing pump lightwaves at frequencies $\xi_1, \xi_2, \ldots, \xi_m$ are $P_{p\xi 1}, P_{p\xi 2}, \ldots, P_{p\xi m}$ ($\upsilon_1<\upsilon_2<\ldots<\upsilon_n<\xi_1<\xi_2<\ldots<\xi_m$), and that there is no Raman transition between the WDM signals.

As stated above, both WDM signal and pump lightwave are discrete spectrums, so that the integration of equation 1 is replaced by addition.

By applying a WDM signal of a frequency $\upsilon_k$ and power $P_{s\upsilon k}$ to $P_\upsilon$ of equation 1, the following equation is obtained:

$$\frac{dP_{s\upsilon k}}{dz} = -\alpha_{\upsilon k} P_{s\upsilon k} + P_{s\upsilon k} \sum_{\varsigma=1}^{gn} \frac{g_{\varsigma\upsilon k}}{A_{\text{eff}\varsigma}} P_{p\varsigma} \quad \text{Equation 2}$$

Further, by applying a pump lightwave of a frequency $\xi_j$ and power $P_{p\xi j}$ to $P_\upsilon$ of equation 1, the following equation is obtained:

$$\frac{dP_{pq}}{dz} = -o_{ci} P_{rcj} + P_{pcj} \sum_{\varsigma=1}^{gn} \frac{g_{\varsigma ci}}{A_{\text{eff}\varsigma}} P_{p\varsigma} -$$

$$P_{pci} \sum_{\varsigma=1}^{\varsigma i-1} \frac{g_{ci\varsigma}}{A_{\text{eff}\varsigma i}} \frac{\varsigma i}{\varsigma} P_{p\varsigma} - P_{pci} \sum_{\varsigma=1}^{\upsilon i} \frac{g_{\varsigma i\upsilon}}{A_{\text{eff}\varsigma i}} \frac{\varsigma i}{\upsilon} P_{s\upsilon} \quad \text{Equation 3}$$

The power $(P_{s\upsilon 1}, P_{s\upsilon 2}, \ldots, P_{s\upsilon n})$ of the WDM signal is given at the signal input point, and the multiplexing pump lightwave $(P_{p\xi 1}, P_{p\xi 2}, \ldots, P_{p\xi m})$ is given at the pump lightwave input point, so that the following results are achieved in the cases of forward pump, backward pump, and a combination of both.

First, the case of forward pump will be described. By substituting the initial value set when $Z=0$ $(P_{s\upsilon 1}, P_{s\upsilon 2}, \ldots, P_{s\upsilon n})$ and $(P_{p\xi 1}, P_{p\xi 2}, \ldots, P_{p\xi m})$, respectively into the right side of equation 2 and equation 3, $\Delta P_{s\upsilon k}$ and $\Delta P_{p\xi j}$ spaced apart from $P_{s\upsilon k}$ and $P_{p\xi j}$ by $\Delta z$ with respect to arbitrary $\upsilon_k$ and arbitrary $\xi_j$ are obtained. By substituting $P_{s\upsilon k}+\Delta P_{s\upsilon k}$ and $P_{p\xi j}+\Delta P_{p\xi j}$ respectively into the right sides of equation 2 and equation 3 as $P_{s\upsilon k}$ and $P_{p\xi j}$, it is possible to obtain $P_{s\upsilon k}$ and $P_{p\xi j}$ spaced apart from the point where $z=0$ by $2\Delta z$. By repeating this, it is possible to obtain $(P_{s\upsilon 1}, P_{s\upsilon 2}, \ldots, P_{s\upsilon n})$ and $(P_{p\xi 1}, P_{p\xi 2}, \ldots, P_{p\xi m})$ at the output point. Thus, the gain is known.

Next, the case of backward pump will be described. It is assumed that multiplexing pump lightwave $(P_{p\xi 1}, P_{p\xi 2}, \ldots, P_{p\xi m})$ is subjected to backward pump when $Z=L$, and that the anticipated value of multiplexing pump light power when $Z=0$ is $P_{p\xi k}-\alpha_{\xi k}L$ (k is an integer ranging from 1 to m), taking into account the transmission loss $\alpha_{\xi k}$. The initial value of the WDM signal lightwaves $(P_{s\upsilon 1}, P_{s\upsilon 2}, \ldots, P_{s\upsilon n})$ when $Z=0$ and the anticipated value of multiplexing pump light power are computed in the same manner as in the case of forward pump. In this process, equation 2 is used as it is, and, regarding equation 3, + sign and − sign are exchanged, obtaining the multiplexing pump light power $(P_{p\xi 1}, P_{p\xi 2}, \ldots, P_{p\xi m})$ when $Z=L$. When the computed multiplexing pump light power and the set multiplexing pump light power coincide with each other within the set error range, the computed WDM signal lightwaves $(P_{s\upsilon 1}, P_{s\upsilon 2}, \ldots, P_{s\upsilon n})$ when $Z=L$ is adopted as a solution satisfying equation 2 and a solution satisfying the equation in which the signs of equation 3 are exchanged. When the computed multiplexing pump light power and the set multiplexing pump light power are outside the set error range, the magnitude of the multiplexing pump light power $(P_{p\xi 1}, P_{p\xi 2}, \ldots, P_{p\xi m})$ when $Z=0$ is anticipated and set anew, and the initial value of the WDM signal lightwaves $(P_{s\upsilon 1}, P_{s\upsilon 2}, P_{s\upsilon n})$ when $Z=0$ and the anticipated set value of the multiplexing pump light power are, as in the case of forward pump, substituted into equation 2 and the equation obtained by exchanging the signs of equation 3, obtaining the multiplexing pump light power $(P_{p\xi 1}, P_{p\xi 2}, \ldots, P_{p\xi m})$ when $Z=L$. The above computation is repeated until the computed multiplexing pump light power when $Z=L$ and the set multiplexing pump light power coincide with each other within the set error range.

Next, the case of a combination of forward pump and backward pump will be described. Here, it is assumed there is no mutual action between forward pump and backward pump. Thus, superposition of forward pump and backward pump is performed to obtain gain. That is, the sum of equation 3 indicating the pump lightwave at the time of forward pump and an equation obtained by exchanging the signs of equation 3 indicating the pump lightwave at the time of backward pump is substituted into the $P_{p\xi}$ of equation 2 indicating the pump lightwave, repeating the algorithm for forward pump and backward pump.

As in the above three cases, simulation is performed using equation 2 and equation 3, the gain wavelength properties of two Raman amplifiers compensate for each other, and a value at which the total Raman gain flatness is decreased is searched for. By applying the value to an actual system, it is possible to realize the optical transmission system of the present invention.

BRIEF DESCRIPTION OF THE DRAWINGS

In the accompanying drawings:

FIG. 1 is a schematic diagram showing an example of an optical transmission system according to an embodiment mode of the present invention, in which

DETAILED DESCRIPTION

An embodiment mode of the present invention will now be described with reference to the drawings.

FIG. 1 is a schematic diagram showing an example of the configuration of an optical transmission system according to the present invention.

Figure 1A:
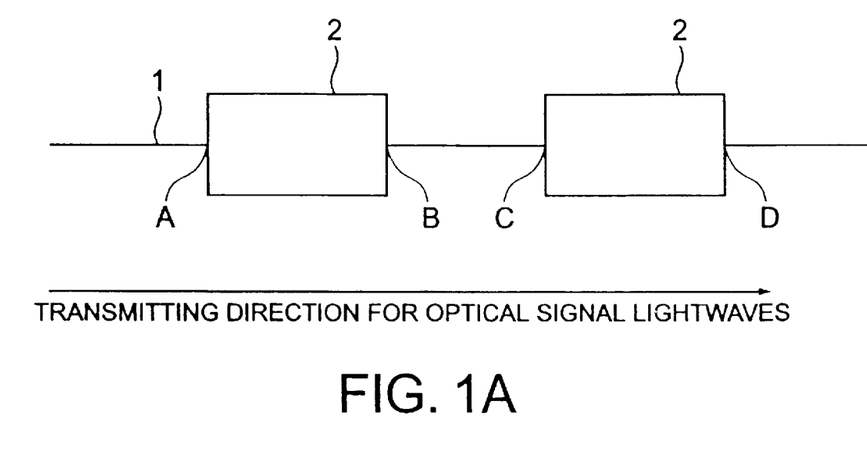
FIG. 1A shows a case in which two Raman amplifiers are used and FIG. 1B shows a case in which three Raman amplifiers are used.

FIG. 1A is a schematic diagram illustrating an example of the configuration of an optical transmission system using two Raman amplifiers. In FIG. 1A, 1 indicates an optical transmission path, and 2 indicates Raman amplifiers. The two Raman amplifiers 2 are arranged in section AB and section CD, which are sections for effecting Raman amplification on a WDM signal, so that they compensate for the respective Raman gain wavelength properties and that the total Raman gain flatness of the two Raman amplifiers is smaller than the Raman gain flatness of each Raman amplifier 2. While in FIG. 1A points B and C are at different positions, it is also possible for them to be at the same position. In this case, it is possible to obtain the total Raman gain wavelength property and the deviation thereof without taking into account the transmission loss deviation in the section BC of the optical transmission path 1.

Figure 1B:
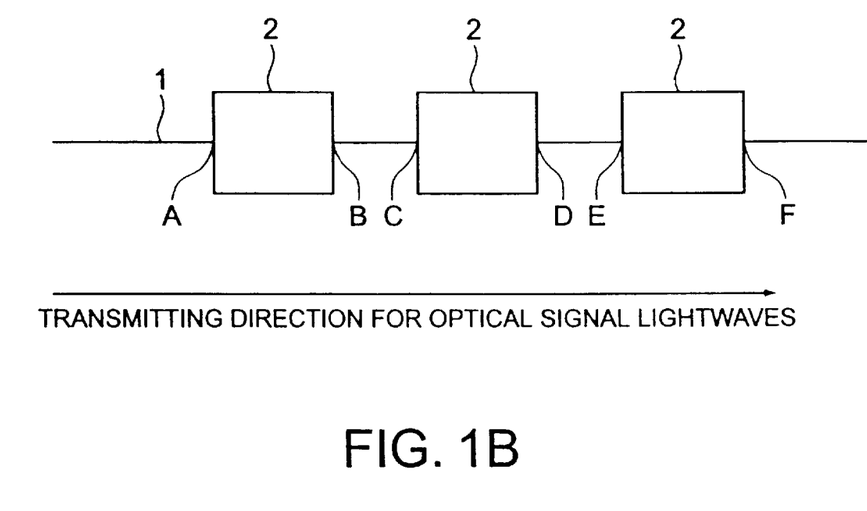

FIG. 1B is a schematic diagram showing an example of the configuration of an optical transmission system using three Raman amplifiers. In this case also, as in the case in which two Raman amplifiers 2 are used, the three Raman amplifiers 2 are arranged in sections AB, CD, and EF, which are sections for effecting Raman amplification on a WDM signal. The configuration of the optical transmission system of the present invention is not restricted to the above. There is no restriction regarding the number of Raman amplifiers 2 connected.

The Raman amplifiers 2 may be of the forward pump type, the backward pump type, or a combination of the forward pump type and the backward pump type. They may be of the distributed type or the discrete type. What is important in the embodiment mode of the present invention is that an optical transmission system should be constructed so that a plurality of Raman amplifiers compensate for the respective Raman gain wavelength properties and that the total Raman gain flatness of the plurality of Raman amplifiers smaller than the cumulative flatness on the assumption that every amplifier has the same gain profile of one of the plurality of Raman amplifier.

Figure 2:
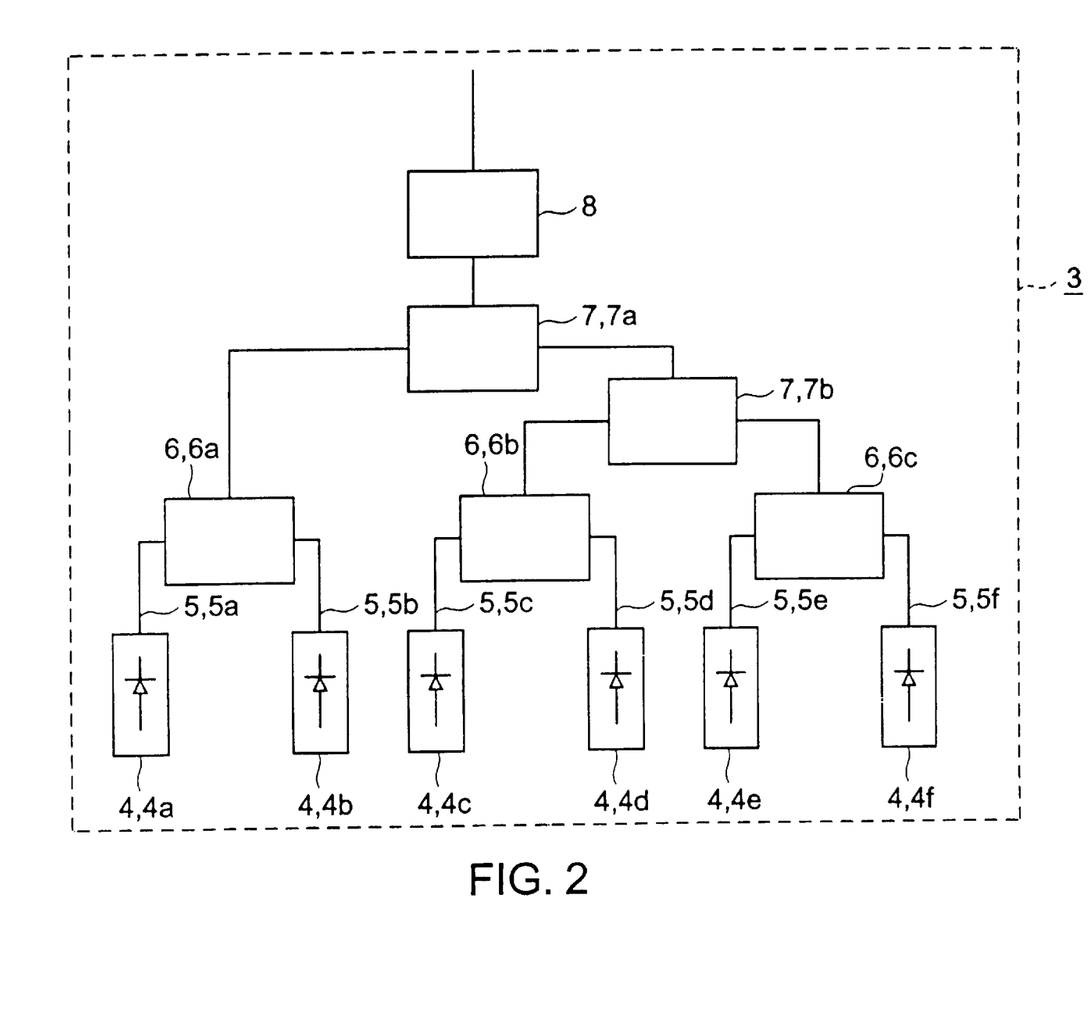
FIG. 2 is a schematic diagram illustrating an example of a high power semiconductor laser unit (HPU) used as a pump light source.

FIG. 2 is a schematic diagram illustrating an example of a high power semiconductor laser unit (hereinafter referred to as HPU) used as a pump light source. In FIG. 2, 3 indicates an HPU, 4 indicates semiconductor lasers, 5 indicates polarization maintaining fibers, 6 indicates polarization beam couplers for polarization-combining input two lightwaves in, for example, an orthogonal state, 7 indicates optical multiplexers, and 8 indicates an isolator.

In FIG. 2, there are provided a plurality of semiconductor lasers 4 (4a, 4b, . . . ). Similarly, there are provided a plurality of polarization maintaining fibers 5 (5a, 5b, . . . ), a plurality of polarization beam couplers 6 (6a, 6b, . . . ), and a plurality of optical multiplexers 7 (7a, 7b, . . . ).

Further, in FIG. 2, the plurality of semiconductor lasers 4 whose lightwave are input to the same polarization beam coupler 6, for example, the semiconductor lasers 4a and 4b output lightwaves in substantially the same wavelength. While FIG. 2 shows a case in which the pump wavelength are of three waves, it is actually possible to form the HPU 3 as shown in FIG. 2 when the pump wavelength is of two waves or more. In respective polarization maintaining fibers 5 (5a, 5b, ...), an optical reflection layer using FBG which substantially coincides with oscillation wavelengths from the semiconductor lasers 4a and 4b is formed to realize stabilization of the oscillation wavelengths from the semiconductor lasers 4a and 4b and narrow the band thereof.

Further, in FIG. 2, it is desirable for the optical multiplexers 7 to consist of a means (hereinafter referred to as WDM filter) having wavelength selectivity, such as WDM couplers or dichroic mirrors.

In the HPU 3 of FIG. 2, two semiconductor lasers 4 (4a, 4b; 4c, 4d; 4e, 4f) are connected to the input side of the polarization beam coupler 6 (6a; 6b; 6c) through the polarization maintaining fibers 5 (5a, 5b; 5c, 5d; 5e, 5f). Further, the output sides of the polarization beam couplers 6b and 6c are connected to the input side of the optical multiplexer 7b, and the output side of the optical multiplexer 7b and the output side of the polarization beam coupler 6a are connected to the input side of the optical multiplexer 7a. Further, the output side of the optical multiplexer 7a is connected to the input side of the isolator 8, and the output side of the isolator 8 is connected to the output end of the HPU 3. In the vicinity of the output end of the HPU 3, there is provided as needed a tap for monitoring the output of the HPU 3.

Figure 3:
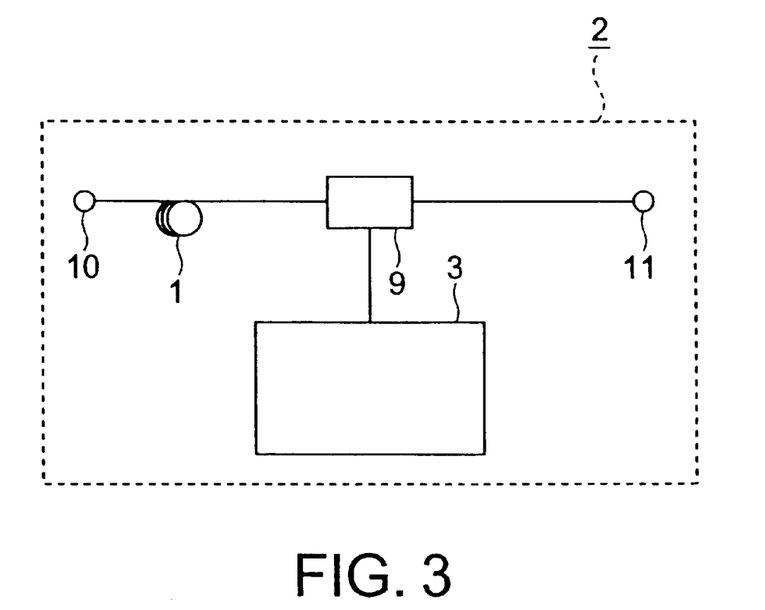
FIG. 3 is a schematic diagram illustrating an example of a distributed Raman amplifier.

An example of a distributed Raman amplifier used in the present invention will now be described. FIG. 3 is a schematic diagram illustrating an example of a distributed Raman amplifier. 9 indicates an optical multiplexer, 10 indicates a WDM signal input point, and 11 indicates a WDM signal output point.

Here, the WDM signal input point 10 and the WDM signal output point 11 do not consist of such things as input terminals or output terminals. The WDM signal input point 10 consists, for example, of point A of FIG. 1, which is an input point of a Raman amplifier in an optical transmission system, and the WDM signal output point 11 consists, for example, of point B of FIG. 1, which is an output point of a Raman amplifier in an optical transmission system. In some cases, one of the WDM signal input point 10 and the WDM signal output point 11 has commonality with an input terminal or an output terminal.

In FIG. 3, in the case of forward pump, pump lightwave travels from the optical multiplexer 9 toward the WDM signal output point 11, and, in the case of backward pump, pump lightwave travels from the optical multiplexer 9 toward the WDM signal input point 10. As in the case of the optical multiplexer 7 of FIG. 2, it is desirable for the optical multiplexer 9 to consist of a WDM filter.

Further, the optical fiber used in the distributed Raman amplifier also serves as the optical transmission path 1. Generally speaking, an optical transmission path has a long distance, so that the length of the optical fiber used in a distributed amplifier is generally several tens to several hundred km. The kind of optical fiber is the non zero dispersion shift fiber (non zero DSF; hereinafter referred to as NZ-DSF).

Figure 4:
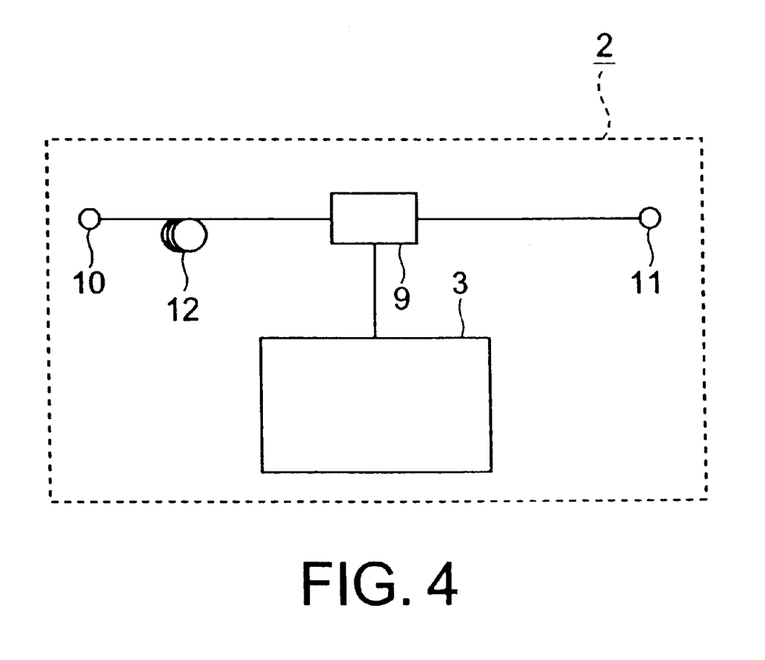
FIG. 4 is a schematic diagram illustrating an example of a discrete Raman amplifier.

An example of the discrete Raman amplifier used in the present invention will now be described. FIG. 4 is a schematic diagram illustrating an example of a discrete Raman amplifier. 9 indicates an optical multiplexer, 10 indicates a WDM signal input point, 11 indicates a WDM signal output point, and 12 indicates an optical amplifier fiber.

As in the case of the distributed Raman amplifier, the WDM signal input point 10 consists, for example, of point A of FIG. 1, which is an input point of a Raman amplifier in an optical transmission system, and the WDM signal output point 11 consists, for example, of point B of FIG. 1, which is an output point of a Raman amplifier in anoptical transmission system. It differs from the distributed Raman amplifier in that the WDM signal input point 10 and WDM signal output point 11 have much in common with such things as input terminals or output terminals.

In FIG. 4, in the case of forward pump, pump lightwave travels from the optical multiplexer 9 toward the WDM signal output point 11, and, in the case of backward pump, pump lightwave travels from the optical multiplexer 9 toward the WDM signal input point 10. In the discrete Raman amplifier of FIG. 4, backward pump is effected. As in the case of FIG. 3, it is desirable for the optical multiplexer 9 to consist of a WDM filter.

Generally speaking, a discrete Raman amplifier is used as a module including the optical amplifier fiber 12, so that the optical amplifier fiber 12 consists of one with large nonlinear refractive index and large Raman gain coefficient. For example, an optical fiber whose nonlinear refractive index and Raman gain coefficient are several times as large as those of a standard single mode fiber (SMF) or a dispersion-shifted fiber (DSF) usually employed as the B optical transmission path 1 is used as the optical amplifier fiber 12 of the discrete Raman amplifier. For example, a dispersion compensating fiber (DCF) is adopted.

Embodiment 1

In Embodiment 1, a distributed Raman amplifier is combined with a discrete Raman amplifier to form an optical transmission system, whose total Raman gain wavelength property was simulated.

Figure 5:
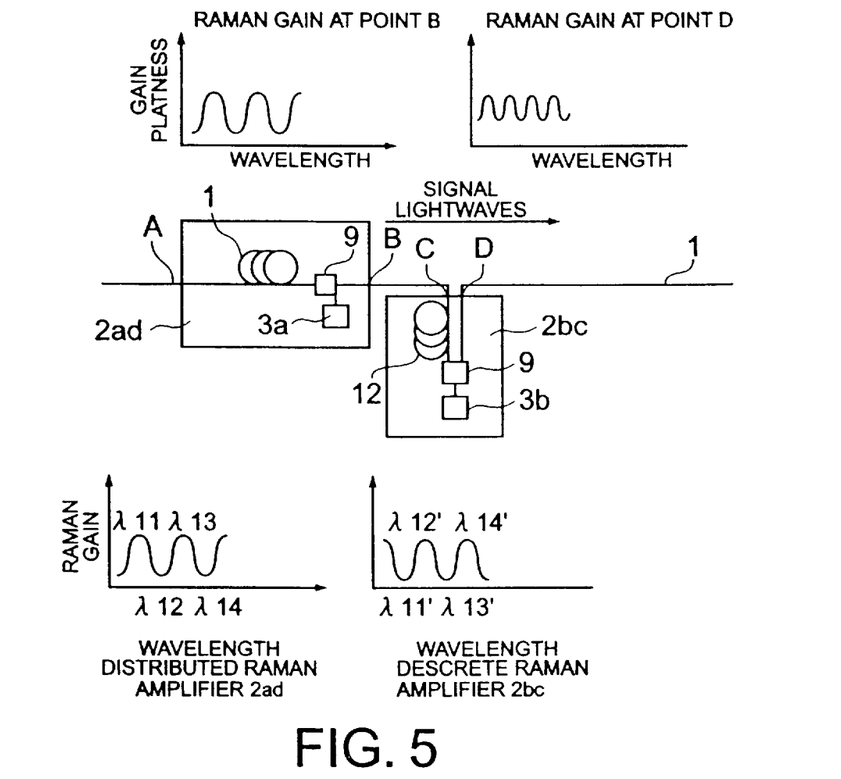
FIG. 5 is a schematic diagram illustrating an optical transmission system according to an embodiment of the present invention.

FIG. 5 is a schematic diagram illustrating an example of an optical transmission system according to Embodiment 1. In FIG. 5, a backward pump type distributed Raman amplifier 2ad and a backward pump type discrete Raman amplifier 2bc are used as the Raman amplifiers.

Due to the backward pump type distributed Raman amplifier 2ad, a Raman gain wavelength property is obtained in which the maximum values of the Raman gain are $\lambda 11$ and $\lambda 13$ and the minimum values of the Raman gain are $\lambda 12$ and $\lambda 14$, and due to the backward pump type discrete Raman amplifier 2bc, a Raman gain wavelength property is obtained in which the minimum values of the Raman gain are $\lambda 11'$ and $\lambda 13'$ and the maximum values of the Raman gain are $\lambda 12'$ and $\lambda 14'$.

And, $\lambda 11$ and $\lambda 11'$, $\lambda 12$ and $\lambda 12'$, ... are respectively caused to substantially coincide with each other, whereby, specifically, the wavelength indicating the maximum value of the Raman gain of the distributed Raman amplifier 2ad and the wavelength indicating the minimum value of the Raman gain of the discrete Raman amplifier 2bc are caused to substantially coincide with each other, and the wavelength indicating the minimum value of the Raman gain of the distributed Raman amplifier 2ad and the wavelength indicating the maximum value of the Raman gain of the discrete Raman amplifier 2bc are caused to substantially coincide with each other. Thus, the Raman gain wavelength property of the distributed Raman amplifier 2ad and the Raman gain wavelength property of the discrete Raman amplifier 2bc compensate for each other, thereby making it possible to make the total Raman gain flatness smaller than the gain flatness of each of the Raman amplifiers 2ad and 2bc.

Here, specific examples of the distributed Raman amplifier 2ad and the discrete Raman amplifier 2bc will be described.

Figure 6:
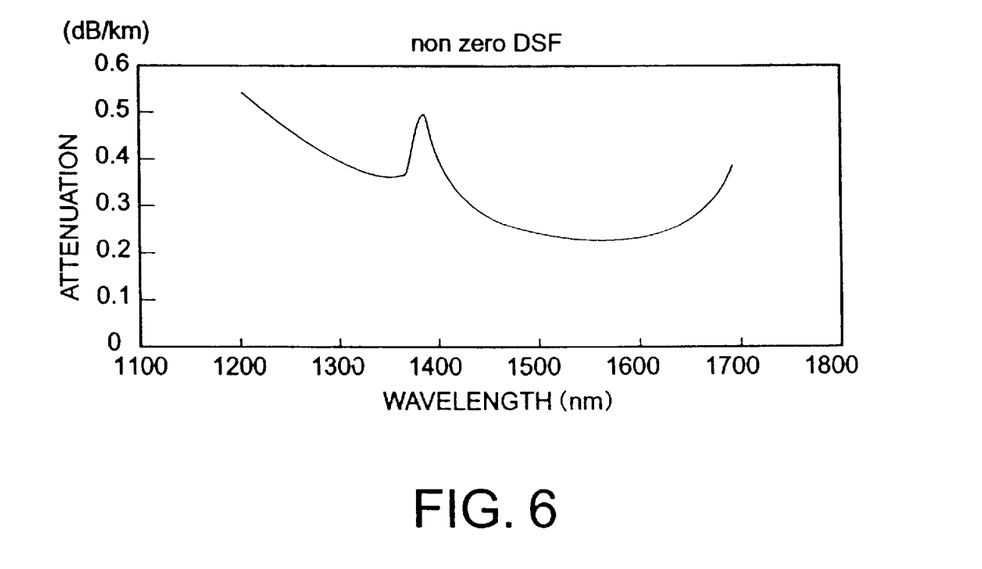
FIG. 6 is a waveform diagram showing an example of the wavelength property of the attenuation of NZ-DSF.
Figure 7:
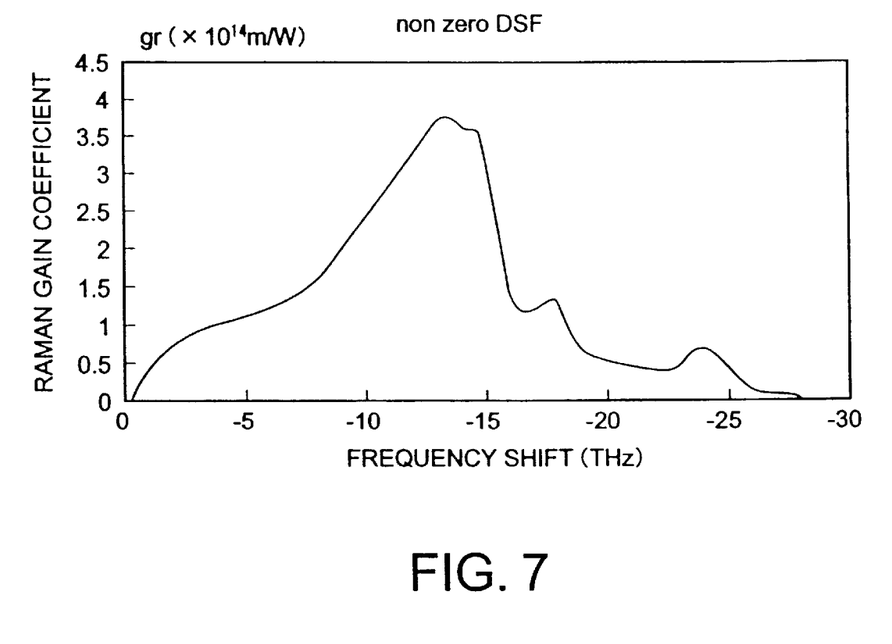
FIG. 7 is a waveform diagram showing an example of the frequency property of the Raman gain coefficient of NZ-DSF.
Figure 8:
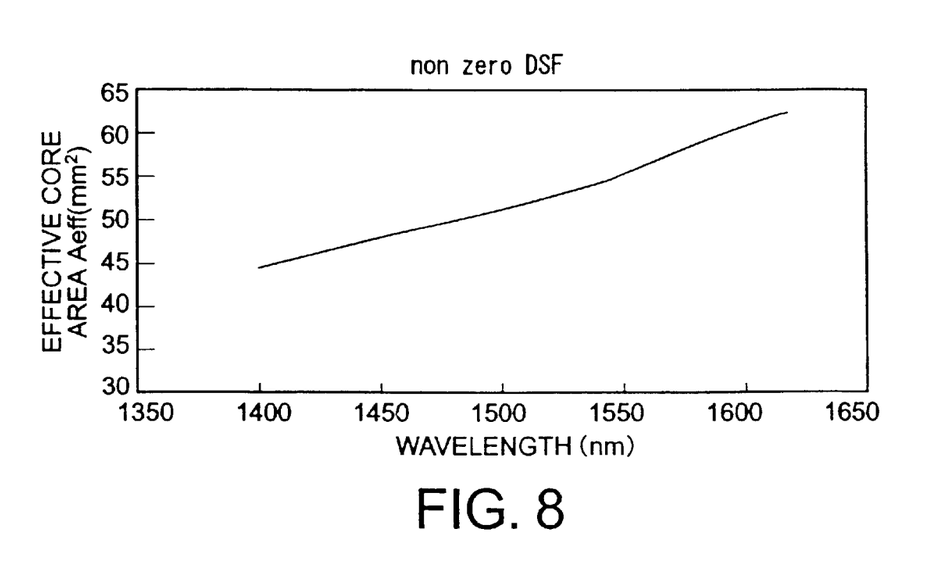
FIG. 8 is a waveform diagram showing an example of the wavelength property of the effective core area (Aeff) of NZ-DSF.

First, a specific example of the distributed Raman amplifier 2ad will be described. FIG. 6 shows an example of the wavelength property of the attenuation of NZ-DSF, FIG. 7 shows the frequency shift property of a Raman gain coefficient, and FIG. 8 shows the wavelength property of an effective core area (Aeff). In this embodiment, the length of the NZ-DSF is 100 km.

An HPU 3a will be described referring to the HPU 3 of FIG. 2. The oscillation wavelength of the semiconductor lasers 4a and 4b is 1383 nm, the oscillation wavelength of the semiconductor lasers 4c and 4c is 1395 nm, and the oscillation wavelength of the semiconductor lasers 4e and 4f is 1422 nm. The respective outputs of these wavelengths were adjusted so as to be 250 mW for the wavelength of 1383 nm, 205 mW for the wavelength of 1395 nm, and 230 mW for the wavelength of 1422 nm at the output end of the HPU 3.

Figure 9:
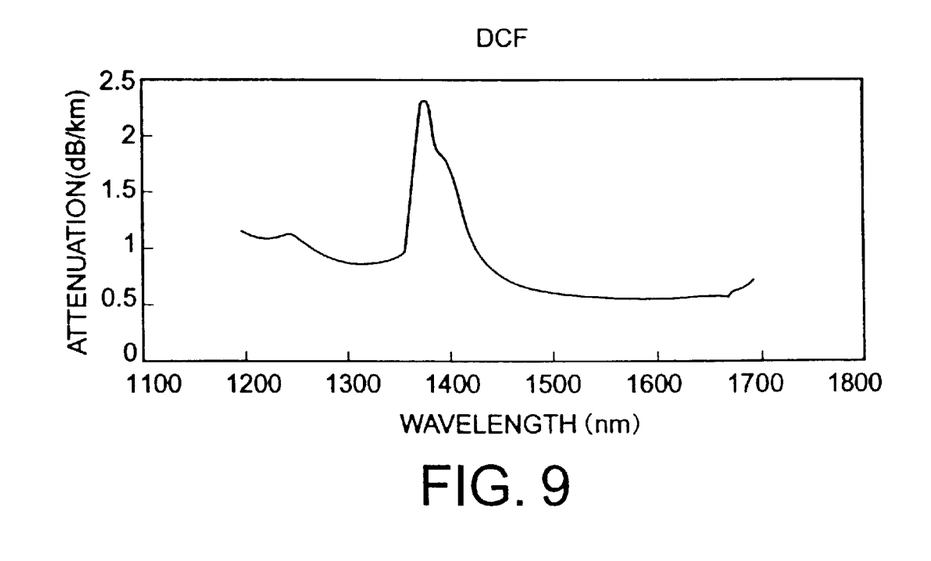
FIG. 9 is a waveform diagram showing an example of the wavelength/attenuation property of DCF used as an optical amplification fiber.
Figure 10:
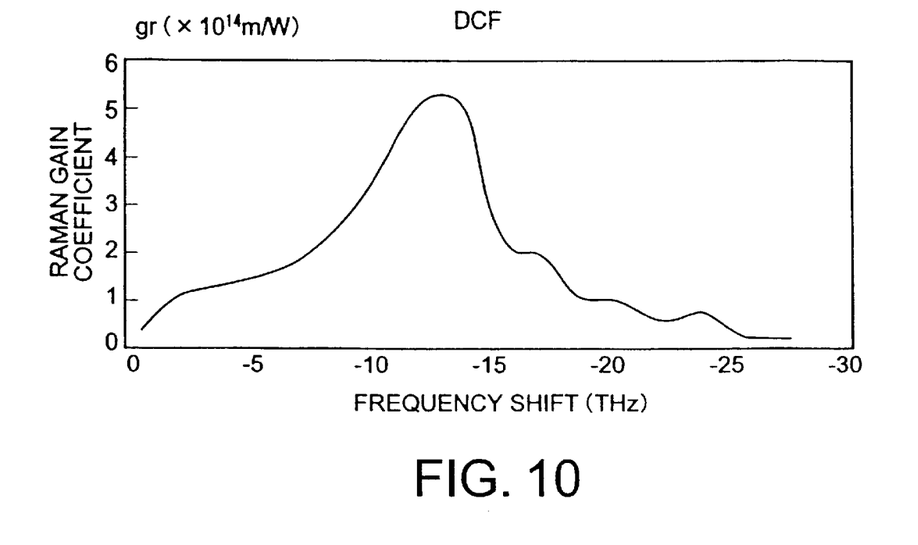
FIG. 10 is a waveform diagram showing an example of the frequency property of the Raman gain coefficient of DCF used as an optical amplification fiber.
Figure 11:
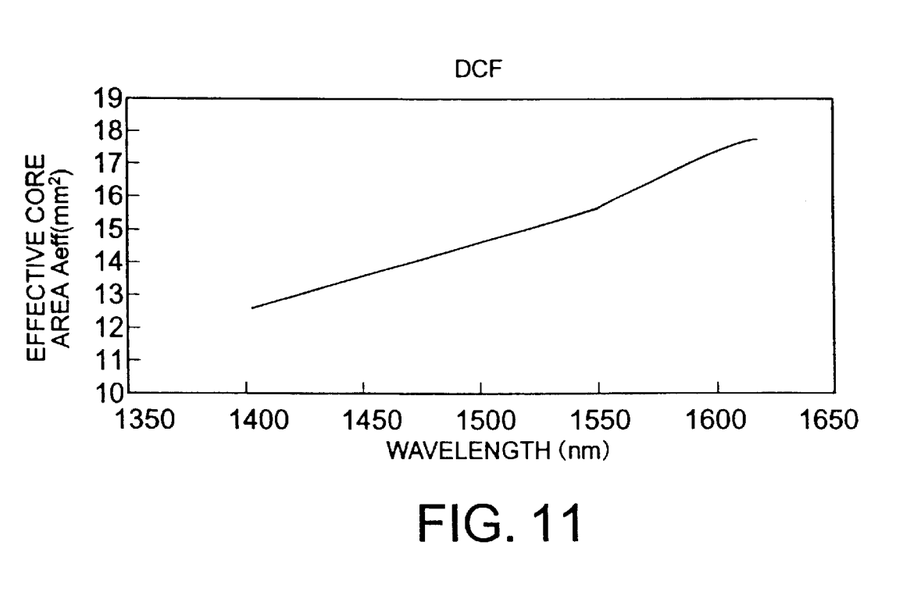
FIG. 11 is a waveform diagram showing an example of the wavelength property of the effective core area (Aeff) of DCF used as an optical amplification fiber.

Next, a specific example of the discrete Raman amplifier 2bc will be described. FIG. 9 shows the wavelength/attenuation property of the DCF used as the optical amplifier fiber 12, FIG. 10 shows the frequency shift property of the Raman gain coefficient, and FIG. 11 shows the wavelength property of the effective core area (Aeff). In this embodiment, a DCF of 6 km was used as the optical amplifier fiber 12.

Further, an HPU 3b will be described referring to the HPU 3 of FIG. 2. The oscillation wavelength of the semiconductor lasers 4a and 4b is 1388 nm, the oscillation wavelength of the semiconductor lasers 4c and 4d is 1402 nm, and the oscillation wavelength of the semiconductor lasers 4e and 4f is 1429 nm. In the polarization beam coupler 6, two waves of substantially the same wavelength were polarization-combined so as to be in a substantially orthogonal state of polarization. The respective outputs of these wavelengths were adjusted so as to be 260 mW for the wavelength of 1383 nm, 217 mW for the wavelength of 1395 nm, and 166 mW for the wavelength of 1422 nm at the output end of the HPU 3.

Here, the power, frequency, and attenuation of the WDM signal lightwaves input to the distributed Raman amplifier 2ad and the power, frequency, attenuation, and Raman gain coefficient of the wavelength division multiplexing pump lightwave were substituted into equations 2 and 3 for simulation. The dashed line of FIG. 12 indicates the resultant gain wavelength property.

Figure 12:
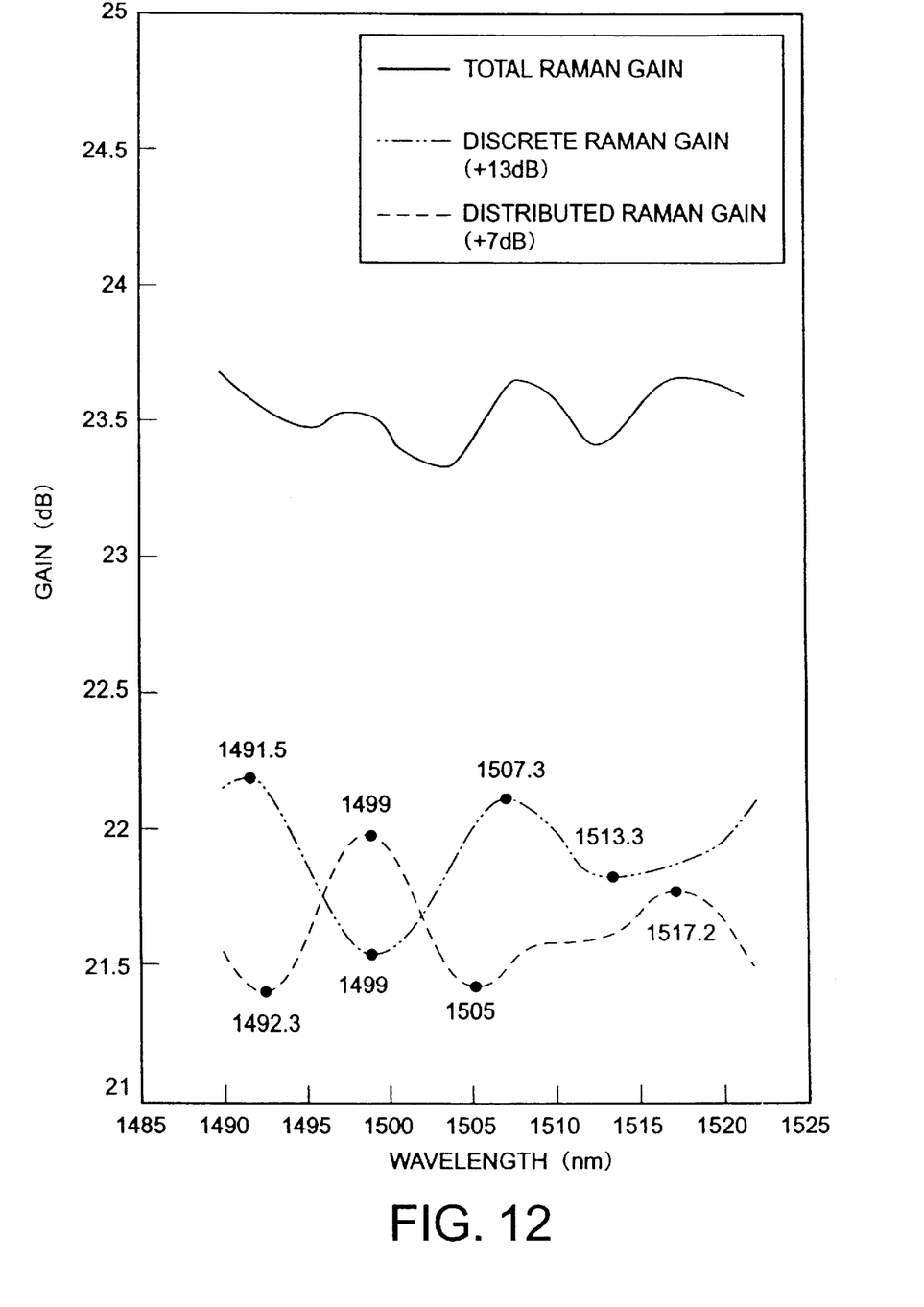
FIG. 12 is a waveform diagram showing an example of the gain wavelength property of a Raman amplifier used in the optical transmission system of the present invention, the dashed line showing the gain wavelength property of a distributed Raman amplifier, the two-dot chain line showing the gain wavelength property of a discrete Raman amplifier, and the solid line showing the total Raman gain wavelength property of a discrete Raman amplifier and a distributed Raman amplifier.

The gain wavelength property indicated by the dashed line of FIG. 12 is raised by 7 dB over the entire wavelength band so as to facilitate the reading of the graph. In the gain wavelength property graph of the dashed line of FIG. 12, it is assumed that the difference between the maximum value and minimum value of the gain is the gain flatness. The minimum gain value is 14.4 dB at the wavelength of 1492.3 nm, and the maximum gain value is 15.0 dB at the wavelength of 1499.0 nm, so that the gain flatness of the gain wavelength property is 0.6 dB.

Further, when the power, frequency, and attenuation of the WDM signal lightwaves input to the discrete Raman amplifier 2bc and the power, frequency, attenuation, and Raman gain coefficient of the wavelength division multiplexing pump lightwave are substituted into equations 2 and 3 for simulation, the gain wavelength property as indicated by the two-dot chain line of FIG. 12 is obtained.

The gain wavelength property indicated by the two-dot chain line of FIG. 12 is raised by 13 dB over the entire wavelength band so as to facilitate the reading of the graph. In the gain wavelength property graph of the two-dot chain line of FIG. 12, it is assumed that the difference between the maximum value and minimum value of the gain is the gain flatness. The minimum gain value is 8.5 dB at the wavelength of 1499.0 nm, and the maximum gain value is 9.2 dB at the wavelength of 1491.5 nm, so that the gain flatness of the gain wavelength property is 0.7 dB.

Next, the result of simulation of the total Raman gain wavelength property will be described. The solid line of FIG. 12 indicates the result of simulation of the total Raman gain wavelength property. In the following description, for the sake of convenience, the distributed Raman amplifier 2ad will be referred to as the first Raman amplifier, and the discrete Raman amplifier 2bc will be referred to as the second Raman amplifier.

Referring to FIG. 12, in the first Raman amplifier, the minimum gain value $G_{Amin}$ is attained at the wavelengths of $\lambda_{Amin}$ of 1492.3 nm and 1505.0 nm, and the maximum gain value $G_{Amax}$ is attained at the wavelengths of $\lambda_{Amax}$ of 1499.0 nm and 1517.2 nm. In the second Raman amplifier, the maximum gain value $G_{Bmax}$ is attained at the wavelengths of $\lambda_{Bmax}$ of 1491.5 nm and 1507.3 nm, and the minimum gain value $G_{Bmin}$ is attained at the wavelengths of $\lambda_{Bmin}$ of 1499.0 nm and 1513.3 nm. That is, the wavelength $\lambda_{Bmin}$ indicating the minimum gain value $G_{Bmin}$ of the second Raman amplifier substantially corresponds to the wavelength $\lambda_{Amax}$ indicating the maximum gain value $G_{Amax}$ of the first Raman amplifier, and the wavelength $\lambda_{Bmax}$ indicating the maximum gain value $G_{Bmax}$ of the second Raman amplifier substantially corresponds to the wavelength $\lambda_{Amin}$ indicating the minimum gain value $G_{Amin}$ of the first Raman amplifier.

Further, as can be seen from FIG. 12, the wavelength band of the first Raman amplifier in the form of an upward convex curve including the maximum gain value $G_{Amax}$ and the wavelength band of the second Raman amplifier in the form of a downward convex curve including the minimum gain value $G_{Bmin}$ overlap with each other, and the wavelength band of the first Raman amplifier in the form of a downward convex curve including the minimum gain value $G_{Amin}$ and the wavelength band of the second Raman amplifier in the form of an upward convex curve including the maximum gain value $G_{Bmax}$ overlap with each other.

The first Raman amplifier and the second Raman amplifier are substantially adjacent to each other and connected in series, so that the gain wavelength property of the first Raman amplifier and the gain wavelength property of the second Raman amplifier overlap with each other, generating a total Raman gain flatness. The gain deviation of the total Raman gain flatness indicated by the solid line of FIG. 12 is 0.34 dB, which is smaller than the gain flatness of either the first or second Raman amplifier.

That is, the maximum values and minimum values of the Raman gain wavelength properties of the first Raman amplifier and the second Raman amplifier are not accumulated to cause an increase in the total Raman gain flatness. The wavelength band of the first Raman amplifier in the form of an upward convex curve including the maximum gain value and the wavelength band of the second Raman amplifier in the form of a downward convex curve including the minimum gain value overlap with each other, and the wavelength band of the first Raman amplifier in the form of a downward convex curve including the minimum gain value and the wavelength band of the second Raman amplifier in the form of an upward convex curve including the maximum gain value overlap with each other, so that the Raman gain wavelength properties of the first Raman amplifier and the second Raman amplifier compensate for each other, with the result that the total Raman gain flatness is smaller than the gain flatness of each of the first Raman amplifier and the second Raman amplifier.

Embodiment 2

Two distributed Raman amplifiers were combined to for an optical transmission system, and the total Raman gain wavelength property thereof was simulated.

Figure 13:
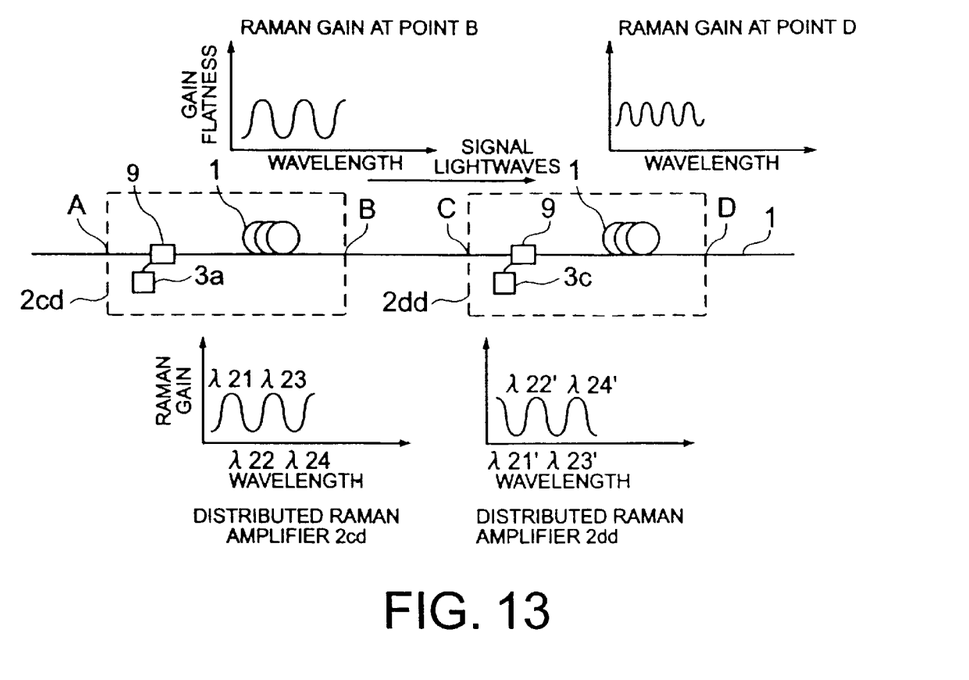
FIG. 13 is a schematic diagram illustrating an optical transmission system according to another embodiment of the present invention.

FIG. 13 is a schematic diagram showing an example of an optical transmission system according to Embodiment 2. In FIG. 13, both the distributed Raman amplifiers 2cd and 2dd are of the forward pump type.

Further, due to the forward pump type distributed Raman amplifier 2cd (including HPU 3a), a Raman gain wavelength property is obtained in which Raman gain maximum values are at $\lambda 21$ and $\lambda 23$ and Raman gain minimum values are at $\lambda 22$ and $\lambda 24$, and due to the forward pump type distributed Raman amplifier 2dd (including HPU 3c), a Raman gain wavelength property is obtained in which Raman gain minimum values are at $\lambda 21'$ and $\lambda 23'$ and Raman gain maximum values are at $\lambda 22'$ and $\lambda 24'$.

In this case as well, as in Embodiment 1, it is possible to make the total Raman gain flatness smaller than the gain flatness of each of the Raman amplifiers.

Generally speaking, in a Raman amplifier, gain flatness is proportional to the magnitude of the Raman gain. Thus, to achieve a gain deviation compensation effect to a maximum degree by the method of Embodiment 1, there exists an optimum proportion between the Raman gains of the distributed amplifier and the discrete amplifier. In Embodiment 2, there exists an optimum proportion between the magnitudes of the Raman gains of the two kinds of Raman amplifiers regardless of the magnitude of the transmission path loss in each section. Thus, when an optimum value of Raman gain exists for each of the Raman amplifier independently of the system design parameter, the optimization of the system as a whole becomes rather complicated. In view of this, when it is necessary to take into account the optimum proportion of Raman gains, the optimization is facilitated by designing the system so that the optimum proportion can be achieved by the system as a whole. For example, in the case of Embodiment 2, in which a large number of Raman amplifiers using two kinds of HPUs (3a and 3c) are used, the system is designed so that the above-mentioned optimum proportion is achieved through comparison of the accumulation of the Raman gains of the Raman amplifiers using the HPU 3a and the accumulation of the Raman gains of the Raman amplifiers using the HPU 3c. In this case, there is no need for the Raman gains of all the sections to be the same value, and it is possible to assign a value corresponding to the transmission path loss of each section. This also applies to the discrete amplifier. Thus, in a system using both discrete and distributed amplifiers, the above optimization can also be achieved for each of them.

COMPARATIVE EXAMPLE

Figure 14:
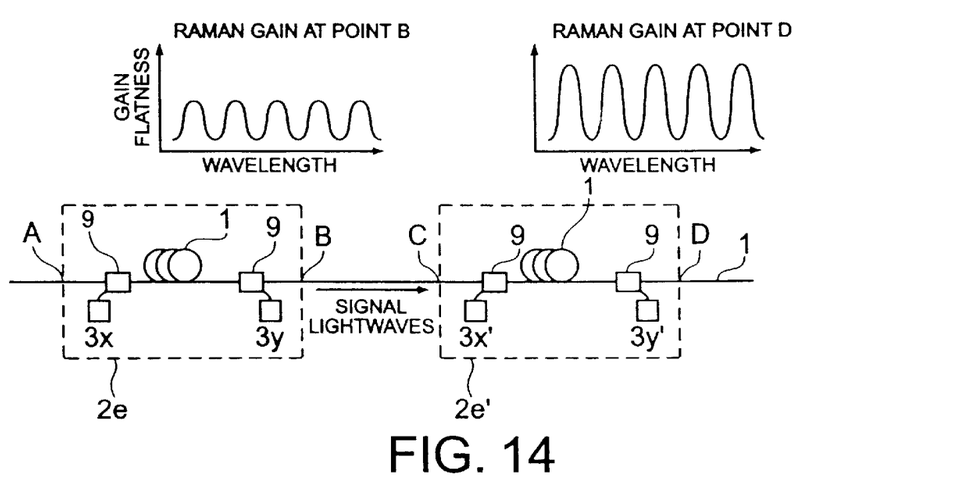
FIG. 14 is a schematic diagram showing an optical transmission system according to a comparative example.

FIG. 14 is a schematic diagram illustrating an example of an optical transmission system according to a comparative example. Forward pump type distributed Raman amplifiers and backward pump type distributed Raman amplifiers are combined with each other so that the longitudinal sections of the optical fiber where stimulated Raman scattering due to the pump light sources of the Raman amplifiers are common to each other to form Raman amplifiers 2e and 2e'. Then, the Raman amplifiers 2e and 2e' were combined to form an optical transmission system, and its total Raman gain wavelength property was simulated.

In this case, the Raman gain wavelength properties of the Raman amplifiers 2e and 2e' were substantially the same, and the Raman gain flatness was approximately 0.6 dB. An HPU 3x of the Raman amplifier 2e and an HPU 3x' of the Raman amplifier 2e', and an HPU 3y of the Raman amplifier 2e and an HPU 3y' of the Raman amplifier 2e' use pump light sources of substantially the same wavelength.

In FIG. 14, as in the embodiments, the total Raman gain flatness (at point D) was measured. The measurement result was approximately 1.1 dB, which was a substantially two-fold increase. It is to be assumed that this is due to the fact that the wavelength indicating the maximum Raman gain value of the Raman amplifier 2e substantially coincides with the wavelength indicating the maximum Raman gain value of the Raman amplifier 2e', and that the wavelength indicating the minimum Raman gain value of the Raman amplifier 2e substantially coincides with the wavelength indicating the minimum Raman gain value of the Raman amplifier 2e'.

That is, to decrease the total Raman gain flatness in the system of the comparative example shown in FIG. 14, it is necessary to adopt the method of the present invention to take into account the pump wavelength arrangement etc. of the Raman amplifiers so that the wavelength band in the form of an upward convex curve including a wavelength indicating the maximum value of the Raman gain of the Raman amplifier 2e and the wavelength band in the form of a downward convex curve including a wavelength indicating the minimum value of the Raman gain of the Raman amplifier 2e' overlap with each other, and that the wavelength band in the form of a downward convex curve including a wavelength indicating the minimum value of the Raman gain of the Raman amplifier 2e and the wavelength band in the form of an upward convex curve including a wavelength indicating the maximum value of the Raman gain of the Raman amplifier 2e' overlap with each other.

In this embodiment, the Raman amplifiers may be of the forward pump type, the backward pump type, or a combination of these types. Further, the Raman amplifiers may be of the distributed type, the discrete type, or a combination of these types. For example, it is possible to use a plurality of amplifiers as disclosed in Japanese Patent Application Laid-open No. 2000-98433.

INDUSTRIAL AVAILABILITY

As described above, according to the present invention, it is possible to form an optical transmission system in which a plurality of Raman amplifiers compensate for the respective Raman gain wavelength properties and in which the total Raman gain flatness is smaller than the value obtained through assumption of an accumulation of each Raman gain flatness of the plurality of used stages of amplifiers.

Further, it is possible to attain a reduction in Raman gain flatness without using any means such as an equalizer.

What is claimed is:

1. An optical transmission system comprising:
   a plurality of Raman amplifiers in cascade with each other including a plurality of pump light sources of different pump wavelengths;
   said plurality of Raman amplifiers have their several optical fibers where stimulated Raman scattering is generated;
   said Raman amplifiers mutually compensate for their wavelength dependence of Raman gain; and
   the total Raman gain flatness is smaller than the cumulative flatness of the assumption that every amplifier has the same gain profile of one of said Raman amplifiers, wherein said plurality of Raman amplifiers are designed to be of at least two types of pump wavelength sets; one of said Raman amplifiers comprises the same pump wavelength set and the same kind of amplifier fiber as another, but their gain levels are different.

2. An optical transmission system comprising:

a plurality of Raman amplifiers in cascade with each other including a plurality of pump light sources of different pump wavelengths;

said plurality of Raman amplifiers have their several optical fibers where stimulated Raman scattering is generated;

said Raman amplifiers mutually compensate for their wavelength dependence of Raman gain; and the total Raman gain flatness is smaller than the cumulative flatness of the assumption that every amplifier has the same gain profile of one of said Raman amplifiers wherein, at least a first Raman amplifier and a second Raman amplifier are used as said plurality of Raman amplifiers;

a wavelength band where the Raman gain wavelength property of said first Raman amplifier exhibits an upward convex curve including a maximum value of Raman gain of $G_{Amax}$ at a wavelength of $\lambda_{Amax}$ and a wavelength band where the Raman gain wavelength property of said second Raman amplifier exhibits a downward convex curve including a minimum value of Raman gain of $G_{Bmin}$ at a wavelength of $\lambda_{Bmin}$ overlap with each other;

a wavelength band where the Raman gain wavelength property of said first Raman amplifier exhibits a downward convex curve including a minimum value of Raman gain of $G_{Amin}$ at a wavelength of $\lambda_{Amin}$ and a wavelength band where the Raman gain wavelength property of said second Raman amplifier exhibits an upward convex curve including a maximum value of Raman gain of $G_{Bmax}$ at a wavelength of $\lambda_{Bmax}$ overlap with each other; and the total Raman gain flatness is smaller than the flatness of said Raman amplifier and said second Raman amplifier.

3. An optical transmission system according to claim 2, wherein the wavelength $\lambda_{Amax}$ and the wavelength $\lambda_{Bmin}$ are substantially equal to each other, and the wavelength $\lambda_{Amin}$ and the wavelength $\lambda_{Bmax}$ are substantially equal to each other.

4. An optical transmission according to claim 1 wherein at least one of a discrete Raman amplifier and a distributed Raman amplifier is used as said Raman amplifier.

* * * * *